US009478776B2

(12) United States Patent
Lee

(10) Patent No.: US 9,478,776 B2
(45) Date of Patent: Oct. 25, 2016

(54) BATTERY PACK HAVING HOUSING WITH INLET OPENING AND CLOSING DEVICE

(75) Inventor: Hyun-Ye Lee, Yongin-si (KR)

(73) Assignees: SAMSUNG SDI CO., LTD., Yongin-Si, Gyeonggi-Do (KR); ROBERT BOSCH GMBH, Stuttgart (DE)

( * ) Notice: Subject to any disclaimer, the term of this patent is extended or adjusted under 35 U.S.C. 154(b) by 933 days.

(21) Appl. No.: 13/439,166

(22) Filed: Apr. 4, 2012

(65) Prior Publication Data

US 2013/0071706 A1    Mar. 21, 2013

(30) Foreign Application Priority Data

Sep. 21, 2011 (KR) ........................ 10-2011-0095165

(51) Int. Cl.
| | |
|---|---|
| *H01M 2/10* | (2006.01) |
| *H01M 2/12* | (2006.01) |
| *H01M 10/48* | (2006.01) |
| *H01M 10/6563* | (2014.01) |
| *H01M 10/613* | (2014.01) |

(52) U.S. Cl.
CPC ......... *H01M 2/1061* (2013.01); *H01M 2/1252* (2013.01); *H01M 10/482* (2013.01); *H01M 10/486* (2013.01); *H01M 10/613* (2015.04); *H01M 10/6563* (2015.04); *H01M 2/1205* (2013.01)

(58) Field of Classification Search
CPC ......... H01M 2/1077; H01M 10/5067; H01M 10/5004; H01M 10/5095
See application file for complete search history.

(56) References Cited

U.S. PATENT DOCUMENTS

| | | | |
|---|---|---|---|
| 6,204,769 B1* | 3/2001 | Arai ...................... | B60L 3/0046 |
| | | | 180/65.1 |
| 2004/0061480 A1* | 4/2004 | Kimura .................. | H01M 6/50 |
| | | | 320/150 |
| 2010/0112424 A1* | 5/2010 | Hayashi .......................... | 429/99 |
| 2011/0059341 A1* | 3/2011 | Matsumoto ........ | B60H 1/00278 |
| | | | 429/82 |

FOREIGN PATENT DOCUMENTS

| | | | |
|---|---|---|---|
| JP | 07-065869 | | 3/1995 |
| JP | 07-320794 | A | 12/1995 |
| JP | 2006-141153 | A | 6/2006 |
| JP | 2007-265658 | A | 10/2007 |
| JP | 2007265658 | A * | 10/2007 |
| JP | 2009-054303 | A | 3/2009 |
| JP | 2009303364 | A * | 12/2009 |
| KR | 10-0783927 | B1 | 12/2007 |

OTHER PUBLICATIONS

Korean Notice of Allowance dated Jun. 24, 2013.

* cited by examiner

*Primary Examiner* — Barbara Gilliam
*Assistant Examiner* — Nathanael Zemui
(74) *Attorney, Agent, or Firm* — Lee & Morse, P.C.

(57) ABSTRACT

A battery pack includes at least one battery module provided with a plurality of battery cells each having a vent that discharges gas, the battery cells being arranged in one direction, and a housing accommodating the battery module, the housing including an inlet and an outlet for air, and an inlet opening and closing device disposed in the inlet.

17 Claims, 5 Drawing Sheets

BATTERY PACK HAVING HOUSING WITH INLET OPENING AND CLOSING DEVICE

BACKGROUND

1. Field

Embodiments relate to a battery pack.

2. Description of the Related Art

In general, a secondary cell may be repeatedly charged and discharged. The secondary cell may be configured for use in portable small electronic equipments such as cell phones, note books, computers, cameras and camcorder etc., or may be configured for use in a battery pack including many battery cells as a power supply for driving a motor for a hybrid electric vehicle (HEV), an electric vehicle (EV) etc., of high power.

SUMMARY

According to an aspect of the invention, there is provided a battery pack, including at least one battery module provided with a plurality of battery cells, each of the battery cells having a vent that discharges gas, the battery cells being arranged in one direction, and a housing accommodating the battery module, the housing including an inlet and an outlet for air, and an inlet opening and closing device, the inlet opening and closing device being disposed in the inlet.

The battery module may include a degassing cover covering a vent on a top of the battery cells.

The battery pack may further include a controller that opens and closes the inlet opening and closing device to adjust air circulation through the inlet.

The battery pack may further include a temperature measuring sensor measuring an interior temperature of the battery pack.

The temperature measuring sensor may contact the battery pack.

The temperature measuring sensor and the controller may be operatively connected such that the controller closes the inlet opening and closing device when the temperature measuring sensor measures an interior temperature of the battery pack that equals or exceeds a predetermined temperature.

The battery pack may further include an alarm device that provides an alarm when the interior temperature of the battery pack equals or exceeds the predetermined temperature.

The battery pack may further include a gas measuring sensor that senses whether a gas is generated in the battery pack or that measures a concentration of generated gas.

The gas measuring sensor may be in the degassing cover.

The gas measuring sensor and the controller may be operatively connected such that the controller closes the inlet opening and closing device when the gas measuring sensor measures a concentration of gas generated in the battery pack that equals or exceeds a predetermined gas concentration.

The battery pack may further include an alarm device that provides an alarm when the concentration of gas generated in the battery pack equals or exceeds the predetermined gas concentration.

The battery pack may further include a temperature measuring sensor measuring an interior temperature of the battery pack and a gas measuring sensor that senses whether a gas is generated in the battery pack or that measures a concentration of generated gas.

The temperature measuring sensor and the gas measuring sensor may be operatively connected to the controller such that the controller closes the inlet opening and closing device when the temperature measuring sensor measures an interior temperature of the battery pack that equals or exceeds a predetermined temperature or when the gas measuring sensor measures a concentration of gas generated in the battery pack that equals or exceeds a predetermined gas concentration.

The battery pack may further include an alarm device that provides an alarm when the interior temperature of the battery pack equals or exceeds the predetermined temperature or when the concentration of gas generated in the battery pack equals or exceeds the predetermined gas concentration.

The inlet opening and closing device may be a solenoid valve or a mechanical opening and closing device.

The battery pack may further include a ventilation fan mounted in the outlet.

According to an embodiment, there is provided a battery pack for a vehicle having a vehicle interior with air therein, the battery pack including at least one battery module provided with a plurality of battery cells, each of the battery cells having a vent that discharges gas, and a housing accommodating the battery module, the housing including an inlet for the air from the vehicle interior, and a damper that opens and closes the inlet.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
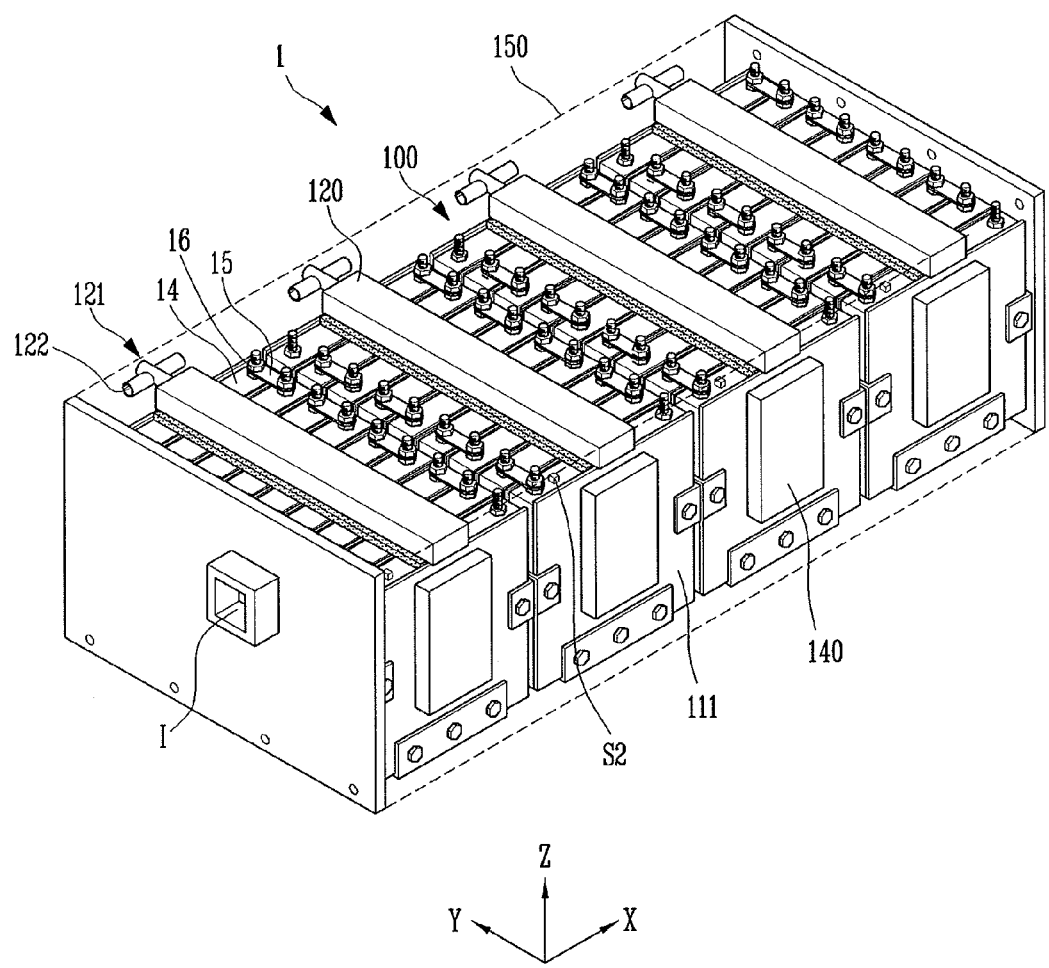
FIG. 1 illustrates a perspective view schematically showing a battery pack according to an exemplary embodiment.

Korean Patent Application No. 10-2011-0095165, filed on Sep. 21, 2011, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 2:
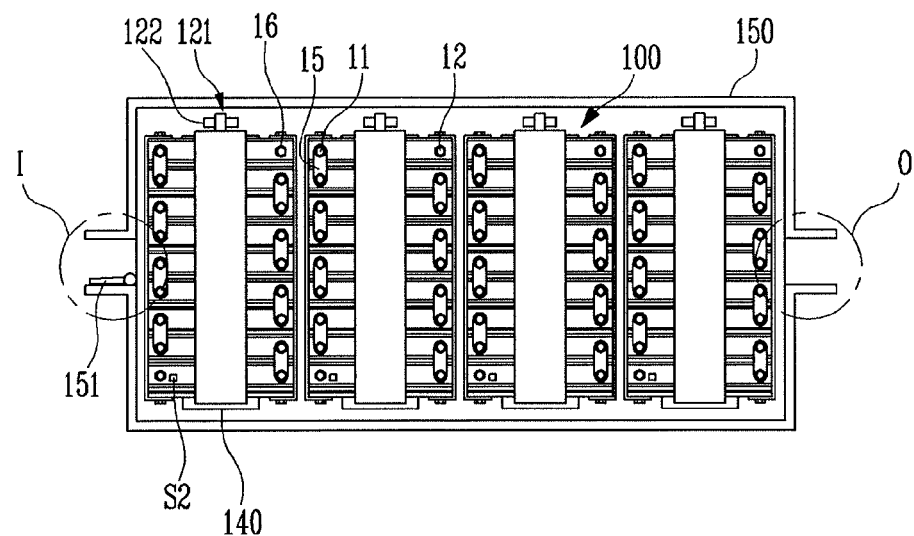
FIG. 2 illustrates a plan view schematically showing the battery pack of FIG. 1.
Figure 3:
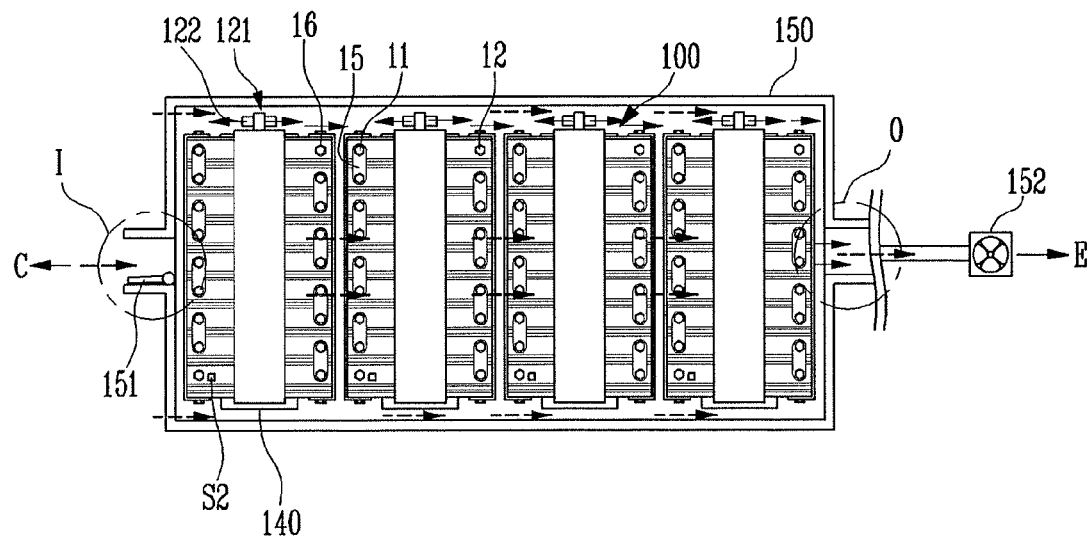
FIG. 3 illustrates a monolithic view schematically showing flow of vehicle indoor air used as cooling medium in the battery pack of FIG. 1 and harmful gas generated from battery cells.
Figure 4:
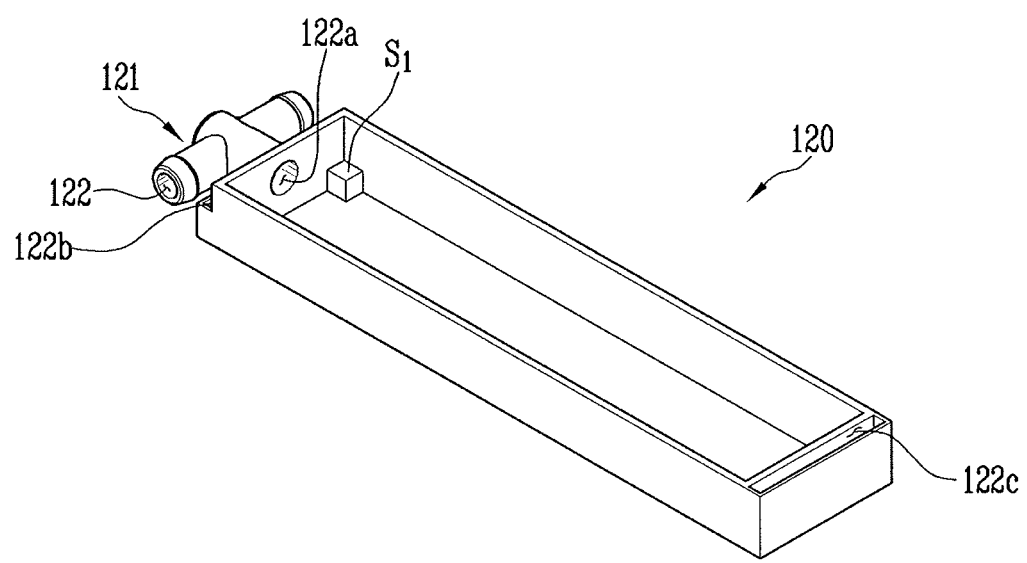
FIG. 4 illustrates a bottom view of the degassing cover in which a gas measuring sensor is mounted according to an embodiment.
Figure 5:
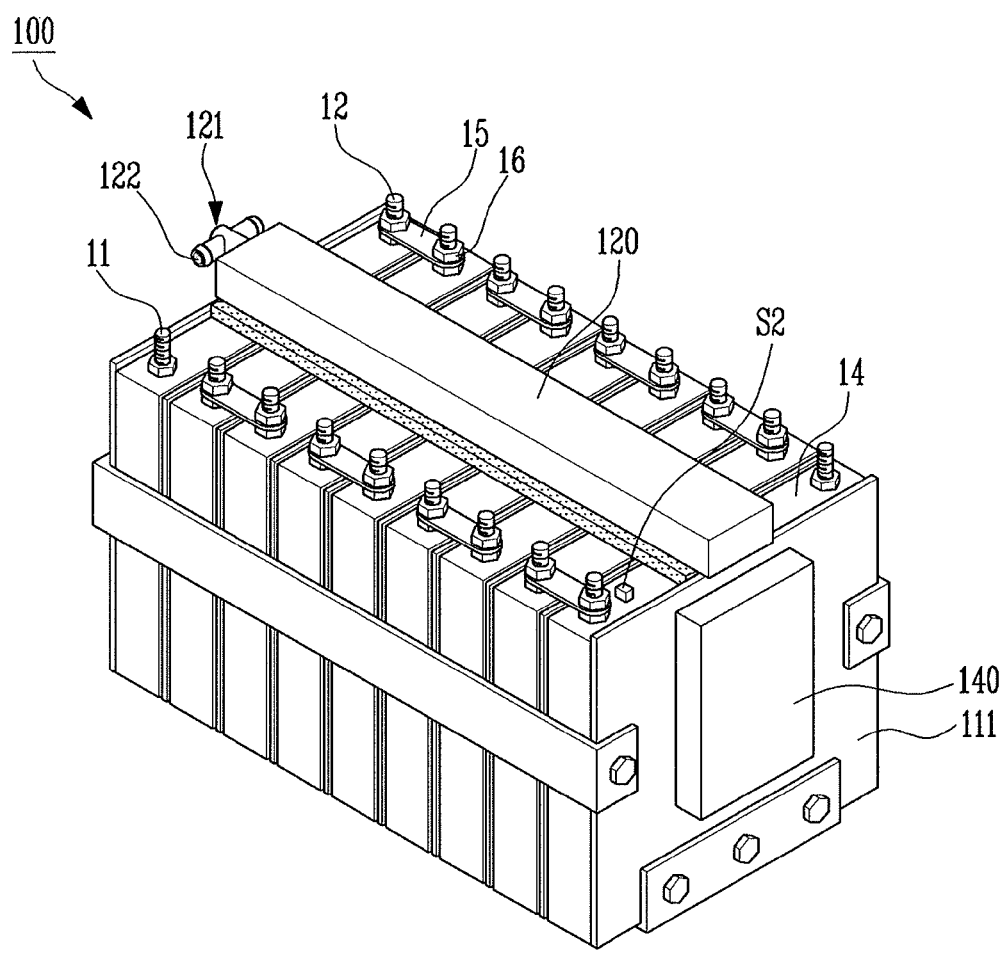
FIG. 5 illustrates a perspective view schematically showing a battery module included in the battery pack of FIG. 1 and mounted with a temperature measuring sensor.
Figure 6:
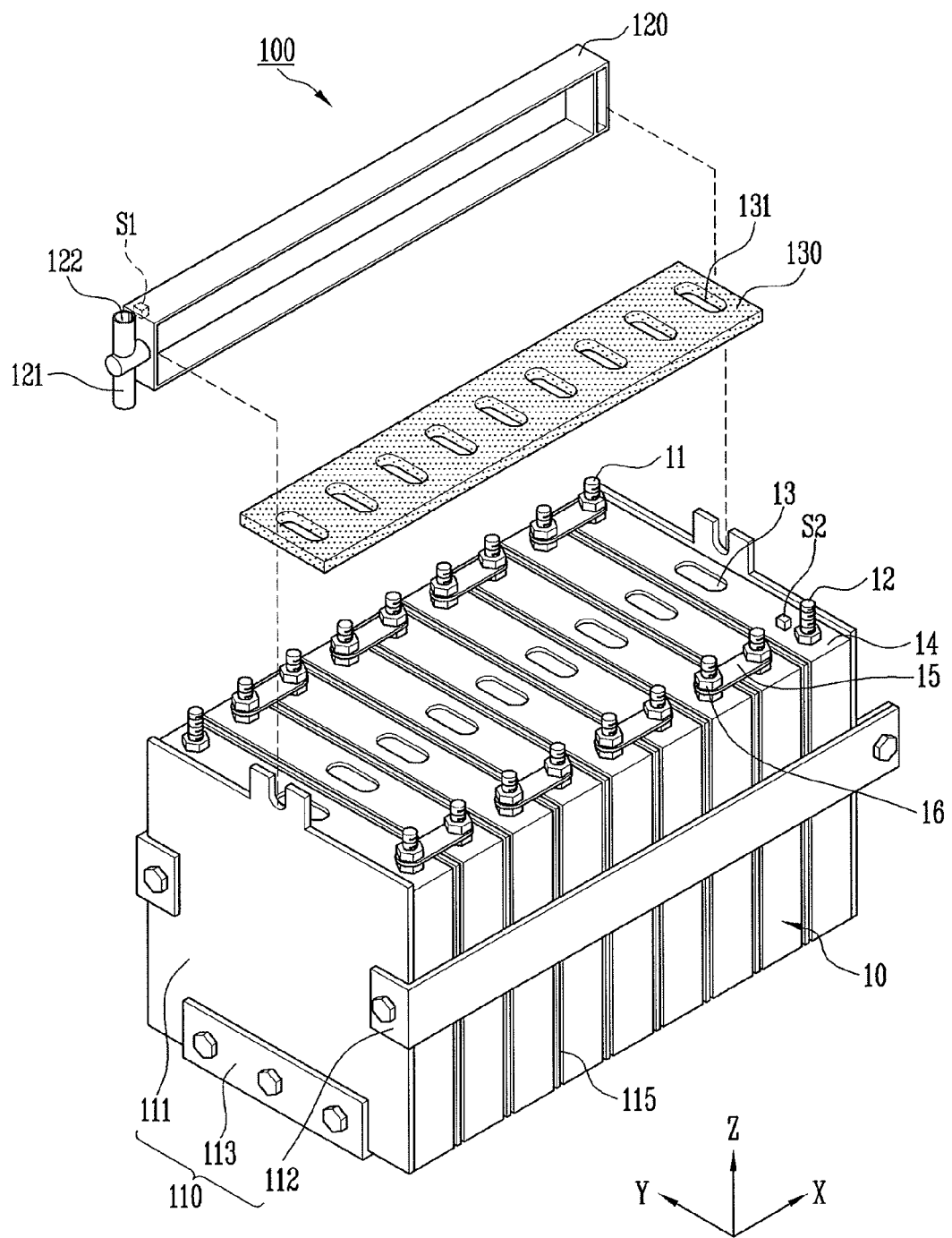
FIG. 6 illustrates an exploded perspective view of FIG. 5.

FIG. 1 is a perspective view schematically showing a battery pack according to an exemplary embodiment. FIG. 2 is a plan view schematically showing the battery pack of FIG. 1. FIG. 3 is a monolithic view schematically showing flow of vehicle indoor air used as cooling medium in the battery pack of FIG. 1 and harmful gas generated from battery cells. FIG. 4 is a bottom view of the degassing cover in which a gas measuring sensor is mounted according to an embodiment. FIG. 5 is a perspective view schematically showing a battery module included in the battery pack of FIG. 1 and mounted with a temperature measuring sensor. FIG. 6 is an exploded perspective view of FIG. 5.

The battery pack 1 according to an exemplary embodiment includes at least one battery module 100 provided with a plurality of battery cells 10, each having a vent portion 13 discharging gas, the battery cells 10 being arranged or aligned in one direction, a housing 150 accommodating the battery module 100 and including an inlet I and an outlet O for air of a vehicle interior C, and an inlet opening and closing device 151 disposed in the inlet I. The inlet opening and closing device may take the form of a valve or damper.

In FIGS. 1 and 2, the housing 150 may accommodate at least one battery module 100. The battery module 100 accommodated in the housing 150 may be arranged or aligned so that sides of the battery cells 10 face each other.

The battery pack 1 including the plurality of battery cells 10 may be used as a power supply for driving of high-output motor. The battery pack 1 may generate much heat in charging and discharging operations, and such heat may damage the battery cells 10. Accordingly, it is advantageous to cool the battery cells 10. The air of the vehicle interior C may be used as a cooling medium.

In FIG. 3, the air of the vehicle interior C, indicated as a dotted arrow, may be introduced into the inside of the housing 150 through the inlet I and may cool the battery cells 10 while passing through a space between the plurality of battery cells 10 disposed in the battery pack 1. The inlet opening and closing device 151 may be opened, thereby not hindering the introduction of air from the vehicle interior C. The introduced air of the vehicle interior C may pass through surroundings of the battery module 100 or through the space between the plurality of battery cell 10 and may be discharged to the outside of the housing 150 through the outlet O connected to the vehicle exterior E. A ventilation fan 152 assisting the discharging of a cooling medium or refrigerant may be connected to the outlet O to smoothly discharge the cooling medium or refrigerant.

Referring to FIGS. 3 to 6, a degassing cover 120 may be arranged above the battery cells 10, and an integrated insulating member 130 made up of materials such as a gasket material, etc. may be interposed between vents 13 of the battery cells 10 and the degassing cover 123. The insulating member 130 may be an integrated type having a plurality of openings 131 corresponding to the vents 13. A size of the openings 131 may be larger than the size of the vents 13. The degassing cover 120 may be hexahedral in shape so that the inside thereof may be open in one direction. The degassing cover 120 may be seated on an insulating member 130 so that the open surface faces the vent 13. The width of the insulating member 130 may be larger than the width of the degassing cover 120. Accordingly, a gas leakage may be prevented. The degassing cover 120 may closely contact the insulating member 130 to form a flow passage of the gas. Further, one side of the degassing cover 120 may be provided with a protruded discharge portion 121 connected to the flow passage of the gas. The discharge portion 121 may include side ends, each provided with a discharge hole 122 discharging the gas.

When gas is generated from the vent 13 of one of the battery cells 10 due to heat, ignition, or abnormal operation of the battery cell 10, the inlet opening and closing device 151 is closed by a controller 140 to be described later to block air circulation between the vehicle interior C and the inlet I. Therefore, the gas, indicated as an arrow of a solid line in FIG. 3, moves along the gas flow passage of the degassing cover 120, passes through the outlet 122a, and is discharged through the discharge hole 122 of the discharge portion 121. The ventilation fan 152 assisting the discharge of the cooling medium may be connected to the outlet O. Accordingly, the gas is discharged through the discharge holes 122 positioned at the both side ends of the discharge portion 121 and may be smoothly discharged to the outlet O, and then, may be finally discharged to the vehicle exterior E.

In FIG. 4, a gas measuring sensor S1 sensing whether gas is generated from the battery cell 10 or measuring the concentration of the generated gas may be mounted in the degassing cover 120. The position where the gas measuring sensor S1 is mounted may vary. For example, it is possible to mount the gas measuring sensor S1 in a position to sense whether gas is generated from the battery cell 10 or to measure gas in the battery pack 1. For example, in an implementation, the gas measuring sensor S1 may be mounted in the surroundings of the vent 13 of the battery cell 10.

The battery pack 1 may also include a temperature measuring sensor S2, as described in more detail below.

A controller 140 may be further provided in the battery pack 1 according to an embodiment. When the battery module 100 receives a signal from a temperature measuring sensor S2 that a temperature of the battery pack 1 equals or exceeds a predetermined temperature or receives a signal from a gas measuring sensor S1 that a gas concentration of the battery pack 1 equals or exceeds a predetermined gas concentration, the controller 140 closes the inlet opening and closing device 151 to block the air circulation between the vehicle interior C and the inlet I.

The inlet opening and closing device 151 may be a simple mechanical opening and closing device or a solenoid valve. The term "solenoid valve" may refer to a valve to enable a fluid to flow or to block the fluid by controlling the opening and closing according to an electrical signal. The solenoid valve may make use of properties of an iron valve that interacts with a magnetic field when current flows into electronic coils called a solenoid to form the magnetic field.

Further, when the battery module 100 has a temperature equal to or greater than a predetermined temperature or a gas concentration equal to or greater than a predetermined gas concentration, the interior of the battery pack 1 of the present embodiment may be further provided with an alarm device (not shown) connected to the controller 140. The alarm may alert a vehicle's driver to the high temperature or high gas concentration, thereby avoiding in advance the occurrence of serious problems such as safety accidents due to the vehicle driver's vision impairment or body damages caused by the suctioning of toxic gases.

In FIGS. 5 and 6, individual ones of the battery cells 10 may include a battery case having an opening and a cap plate 14 shielding the opening. The battery case may accommodate an electrode assembly having a cathode plate and a anode plate, a separator interposed between the cathode plate and the anode plate, and an electrolyte. A cathode terminal 11 connected to the cathode plate and an anode terminal 12 connected to the anode plate may be configured at ends of the cap plate 14 to protrude outside the battery case. The cathode plate and the anode plate forming the electrode assembly may react with the electrolyte to generate energy, and the energy may be transferred to the outside through the cathode terminal 11 and the anode terminal 12.

In general, the battery cells 10 may generate heat while performing repeated charging and discharging. Such a heating may increase the temperature of the battery cell 10, thereby lowering the performance of the battery cell 10 and causing safety problems.

In FIG. 6, the temperature measuring sensor S2 measuring the temperature of the battery cell 10 may be mounted on the battery cell 10. The position where the temperature measuring sensor S2 is mounted may vary. For example, the temperature measuring sensor S2 may be mounted in the battery pack 1 to sense the heat generated from the battery cells 10 and to measure the temperature of the battery cells 10 in the battery pack 1. In an implementation, the temperature measuring sensor may be mounted in the surroundings of the degassing cover 120 of the battery cells 10.

Further, the vent 13 may be provided between the cathode terminal 11 and the anode terminal 12 of a cap plate 14. When gas pressure generated from the interior of the battery cells 10 is above a predetermined value, the vent 13 may rupture to act as a passage to discharge the gas from the battery cells 10, which prevents the battery cells 10 from being destroyed by internal pressure.

A plurality of the battery cells 10 may be arranged or aligned in one direction. Wide fronts of the battery cells 10 may be aligned side by side to face each other. The vents 13 may be provided at the center of the plurality of battery cells 10, and may be approximately arranged in one line according to the aligned battery cells 10. The cathode terminal 11 and the anode terminal 12 of two battery cells 10 adjacent to each other may be electrically connected to each other through a bus-bar 15 made of nickel, etc. The bus bar 15 may be provided with a hole capable of being penetrated by the cathode terminal 11 or the anode terminal 12. The bus bar 15 penetrated and connected by the terminals may be fixed by a nut 16, etc.

The plurality of battery cells 10 may be arranged or aligned in one direction so that the wide sides thereof face each other. The battery cells 10 may be accommodated between a pair of end plates 111 to be spaced apart from each other. The narrow sides and bottom surfaces of the battery cells 10 may be accommodated by a side bracket 112. The bottom surfaces of the battery cells 10 may be accommodated by a bottom bracket 113.

The pair of end plates 111 may be arranged to be face-contacted respectively with outermost battery cell 11 to apply pressure to the plurality of battery cells 10 toward the inside. Further, the side bracket 112 may be connected to one end and the other end of a pair of end plates 111 to support both sides of the plurality of battery cell 10, and may be supported by the bottom side of the battery cell 10 or the bottom bracket 113.

Further, the plurality of battery cell 10 supported by the end plate 111, the side bracket 112 and the bottom bracket 113 may be arranged or aligned so that the cathode terminals 11 and the anode terminals 12 are alternatively provided next to each other in the interior thereof. In this configuration, the cathode terminal 11 and the anode terminal 12 may be serially connected using the bus bar 15. The connection structure and the number of battery cells 10 may be varied according to a design of the battery module 100.

Further, a barrier 115 may be interposed between the battery cells 10. The barrier 115 may include a spacer (not shown) to allow the plurality of neighboring battery cells 10 to be spaced apart from each other. The barrier 115 may form a space between the battery cells 10 to provide a passage for a cooling medium for cooling the battery cells 10.

By way of summation and review, a battery pack used as a power supply for driving a motor of high-power may generate much heat by charging and discharging operations. Such a heat may damage the battery cells. Therefore, the battery pack having a structure using air of the vehicle interior as cooling medium may be used.

However, when a battery pack having a structure to use air of a vehicle interior as a cooling medium is mounted in the vehicle interior or trunk, the gas or dust of harmful components generated from the battery cells may be quickly introduced to the vehicle interior due to heating, ignition or abnormal operation of the battery cell. In this case, serious problems such as safety accidents caused by a vehicle driver's vision impairment or bodily damage due to suctioning of harmful gas may be caused.

The embodiments described herein advance the art by providing a battery pack capable of improving stability by shielding a entrance of a inlet connected to the vehicle interior when the harmful gas is detected or temperature of the battery cell is equal to or greater than a predetermined temperature.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A battery pack, comprising:
a plurality of battery modules provided with a plurality of battery cells, the battery cells having vents that discharge gas, the battery cells being arranged in one direction;
degassing covers covering the vents on tops of the battery cells, the degassing covers forming a flow passage of the gas, the degassing covers including discharge portions connected to the flow passage of the gas, the discharge portions including discharge holes discharging the gas from the flow passage of the gas; and
a housing accommodating the battery modules and the degassing covers, the housing including:
an inlet and an outlet for air,
an inlet opening and closing device, the inlet opening and closing device being disposed in the inlet, and
an air passage between the inlet and the outlet for a gas flow of the air in an interior of the housing, the discharge holes being in the air passage such that the gas is discharged from the discharge portions through the discharge holes into the gas flow of the air in the interior of the housing,
wherein the battery modules are arranged adjacent to each other,
wherein the discharge portions are formed in a same direction, and
wherein the gas is discharged from the discharge portions through the discharge holes in parallel with the gas flow of the air in the interior of the housing.

2. The battery pack as claimed in claim 1, further comprising a controller that opens and closes the inlet opening and closing device to adjust air circulation through the inlet, wherein closing the inlet opening and closing device blocks air circulation into the housing.

3. The battery pack as claimed in claim 2, further including a temperature measuring sensor measuring an interior temperature of the battery pack.

4. The battery pack as claimed in claim 3, wherein the temperature measuring sensor contacts the battery pack.

5. The battery pack as claimed in claim 4, wherein the temperature measuring sensor and the controller are operatively connected such that the controller closes the inlet opening and closing device when the temperature measuring sensor measures an interior temperature of the battery pack that equals or exceeds a predetermined temperature such that air is blocked from circulating into the housing.

6. The battery pack as claimed in claim 5, further including an alarm device that provides an alarm when the interior temperature of the battery pack equals or exceeds the predetermined temperature.

7. The battery pack as claimed in claim 2, further including a gas measuring sensor that senses whether a gas is generated in the battery pack or that measures a concentration of generated gas.

8. The battery pack as claimed in claim 7, wherein the gas measuring sensor is in the degassing covers.

9. The battery pack as claimed in claim 8, wherein the gas measuring sensor and the controller are operatively connected such that the controller closes the inlet opening and closing device when the gas measuring sensor measures a concentration of gas generated in the battery pack that equals or exceeds a predetermined gas concentration such that air is blocked from circulating into the housing.

10. The battery pack as claimed in claim 9, further including an alarm device that provides an alarm when the concentration of gas generated in the battery pack equals or exceeds the predetermined gas concentration.

11. The battery pack as claimed in claim 2, further including a temperature measuring sensor measuring an interior temperature of the battery pack and a gas measuring sensor that senses whether a gas is generated in the battery pack or that measures a concentration of generated gas.

12. The battery pack as claimed in claim 11, wherein the temperature measuring sensor and the gas measuring sensor are operatively connected to the controller such that the controller closes the inlet opening and closing device when the temperature measuring sensor measures an interior temperature of the battery pack that equals or exceeds a predetermined temperature or when the gas measuring sensor measures a concentration of gas generated in the battery pack that equals or exceeds a predetermined gas concentration such that air is blocked from circulating into the housing.

13. The battery pack as claimed in claim 12, further including an alarm device that provides an alarm when the interior temperature of the battery pack equals or exceeds the predetermined temperature or when the concentration of gas generated in the battery pack equals or exceeds the predetermined gas concentration.

14. The battery pack as claimed in claim 1, wherein the inlet opening and closing device is a solenoid valve.

15. The battery pack as claimed in claim 1, further comprising a ventilation fan mounted in the outlet.

16. A battery pack for a vehicle having a vehicle interior with air therein, the battery pack comprising:
  a plurality of battery modules provided with a plurality of battery cells, the battery cells having vents that discharge gas;
  degassing covers covering the vents on tops of the battery cells, the degassing covers forming a flow passage of the gas, the degassing covers including discharge portions connected to the flow passage of the gas, the discharge portions including discharge holes discharging the gas from the flow passage of the gas; and
  a housing accommodating the battery modules and the degassing covers, the housing including:
    an inlet for the air from the vehicle interior,
    a damper that opens and closes the inlet, and
    an air passage for a gas flow of the air in an interior of the housing, the discharge holes being in the air passage such that the gas is discharged from the discharge portions through the discharge holes into the gas flow of the air in the interior of the housing,
  wherein the battery modules are arranged adjacent to each other,
  wherein the discharge portions are formed in a same direction, and
  wherein the gas is discharged from the discharge portions through the discharge holes in parallel with the gas flow of the air from the vehicle interior in the interior of the housing.

17. The battery pack as claimed in claim 1, wherein the discharge holes are provided at both side ends of the discharge portions such that flow through the discharge holes is perpendicular to flow through the discharge portions.

* * * * *